(12) United States Patent
Ulmer

(10) Patent No.: US 6,696,840 B2
(45) Date of Patent: Feb. 24, 2004

(54) DEVICE FOR TRIGGERING IGNITION CIRCUITS

(75) Inventor: Michael Ulmer, Moessingen (DE)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 10/085,546

(22) Filed: Feb. 27, 2002

(65) Prior Publication Data

US 2002/0149374 A1 Oct. 17, 2002

(30) Foreign Application Priority Data

Feb. 28, 2001 (DE) .......................... 101 09 620

(51) Int. Cl.[7] ................................ F02P 17/00
(52) U.S. Cl. ..................................... 324/380
(58) Field of Search ................. 324/380, 381, 324/382, 402, 378, 384

(56) References Cited

U.S. PATENT DOCUMENTS 6,123,057 A * 9/2000 Goras et al. .............. 123/406.2
6,365,987 B2 4/2002 Riederer et al. ........... 307/10.1

FOREIGN PATENT DOCUMENTS

DE 198 28 432 1/2000

* cited by examiner

*Primary Examiner*—Walter E. Snow
*Assistant Examiner*—Donald M Lair
(74) *Attorney, Agent, or Firm*—Kenyon & Kenyon

(57) ABSTRACT

A device for triggering ignition circuits is used to increase safety without additional expenditures in the form of hardware or wiring. Plus and minus output elements of various ICs are used for this purpose. Ignition circuit diagnosis is now also distributed over two ICs. Ignition circuit diagnosis includes, in particular, the resistance measurement of the respective ignition circuit. Each substrate, in other words IC, therefore has at least one plus and one minus output element.

6 Claims, 1 Drawing Sheet

DEVICE FOR TRIGGERING IGNITION CIRCUITS

BACKGROUND INFORMATION

Fully-integrated plus and minus output elements having diagnostic functions for ignition circuits on a common substrate are already known. Furthermore, it is known that such an IC can trigger multiple ignition circuits.

SUMMARY OF THE INVENTION

The device according to the present invention for triggering ignition circuits has the advantage over the related art, that the safety of the device is increased without additional hardware and wiring, because the plus and minus output elements with their associated ignition circuit diagnosis are implemented independently of one another, and the plus and minus output elements for one ignition circuit can be located on two identical integrated circuits that are independent of one another. A separate implementation of plus and minus output elements is therefore possible.

Furthermore, it is advantageous to have plus and minus output elements present on one substrate, giving the integrated circuit designer the option of choosing the suitable wiring regarding plus and minus output elements for any given ignition circuit, depending on the situation.

DETAILED DESCRIPTION

In order to be able to wire ignition circuits with increased safety and without additional outlay, the ignition circuits are provided, according to the present invention, with plus and minus output elements of different ICs and, therefore, substrates. Here, the term substrate designates an IC, which today is made primarily of silicon. However, it is possible to use other semiconductor materials to form a substrate, on which the circuit design can be implemented.

Figure 1:
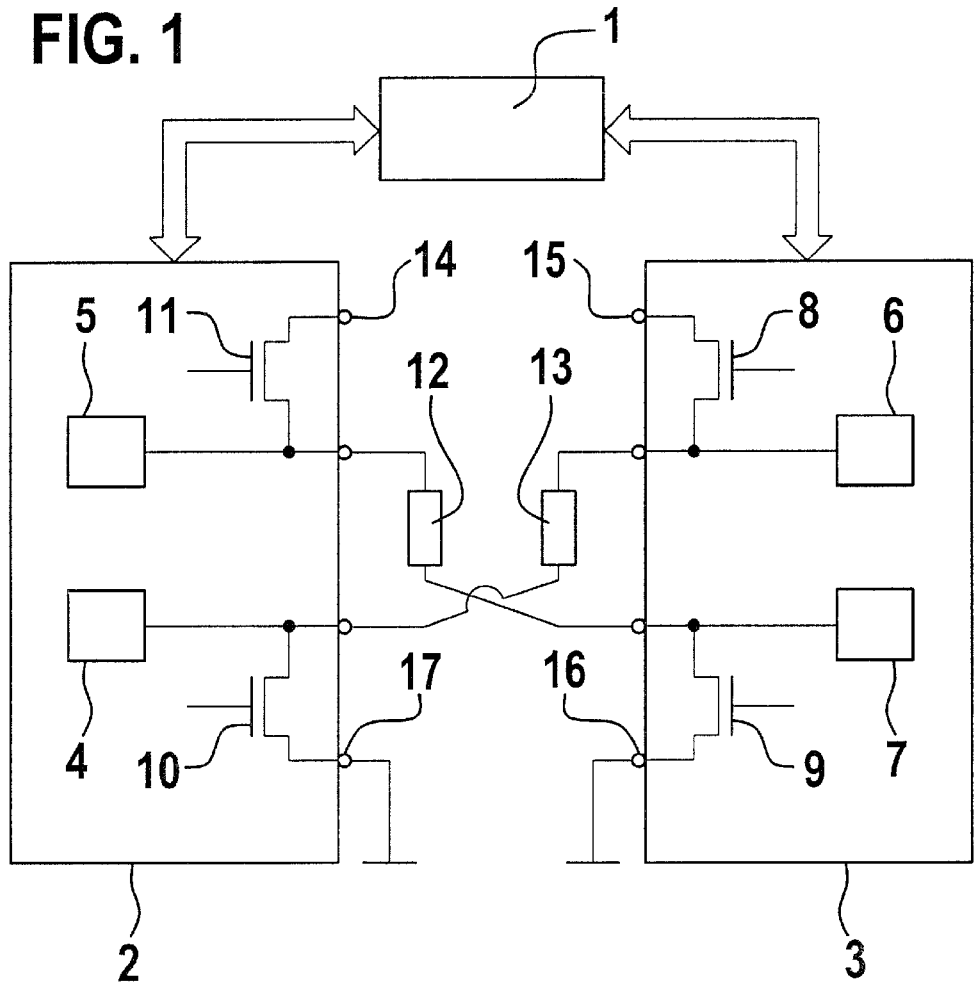
FIG. 1 is a block diagram of the device according to the present invention.

FIG. 1 shows a diagram of the device according to the present invention. A processor 1 is connected via data inputs/outputs to substrate 2 and substrate 3, each of which represents an ignition circuit triggering IC. It is possible for processor 1 to be connected to more than two substrates. Processor 1 controls and monitors the components of ignition circuit ICs 2 and 3 via the data inputs/outputs. Ignition circuit IC 2 has a plus output element transistor 11, a minus output element transistor 10, a diagnostic block 5, and another diagnostic block 4. In addition, ignition circuit triggering IC 2 is connected to the supply voltage via connector 14, and to the ground via connector 17.

An ignition circuit is supplied by plus and minus output element transistors or, in short, plus and minus output elements, that are switched through when triggered, in order to supply the ignition circuit with ignition current. The plus output element transistor gets its name from the fact that it is connected to the supply voltage, while the minus output element transistor is connected to the ground.

Ignition circuit IC 3 is built analogously to ignition circuit IC 2. Ignition circuit IC 3 has a plus output element transistor 8, a minus output element transistor 9, and two diagnostic blocks 6 and 7. Plus output element transistor 8 is connected on one side (here the collector) to the supply voltage at connector 15. Minus output element transistor 9 is connected to the ground via connector 17. On the other side, plus output element transistor 8 is connected to ignitor 13 and diagnostic block 6. Ignitor 13 is located outside of ignition circuit triggering IC 3. Minus output element transistor 9 is connected on its other side to ignitor 12 and diagnostic block 7.

Minus output element transistor 10 is connected, on one side, to the ground at connector 17, and on the other side, to diagnostic block 4 and ignitor 13. This places ignitor 13 between plus output element transistor 8 and minus output element transistor 10, or diagnostic block 6 and diagnostic block 4.

Plus output element transistor 11 is connected on one side, as described above, to the supply voltage at connector 14, and on its other side, with diagnostic block 5 and ignitor 12, so that ignitor 12 lies between plus output element transistor 11 and minus output element transistor 9, or between diagnostic block 5 and diagnostic block 7. The bases, or gates, of transistors 8, 9, 10 and 11 are triggered by processor 1, in order to switch these transistors through accordingly. Transistors 8, 9, 10 and 1 1 are switched through in order to fire ignitors 12 and 13, in case restraining devices are to be deployed. Normally, i.e., when ignitors 12 and 13 are not supposed to be fired, diagnostic blocks 4, 5, 6 and 7 perform diagnostic measurements of ignitors 12 and 13, during which ignitors 12 and 13 are measured for resistances that are either too large or too small. The resistances are measured via voltages that decrease due to diagnostic currents across ignitors 12 and 13. If the voltages exceed or fall below the given values across ignitors 12 and 13, there is a malfunction of ignitors 12 and 13, the functionality of ignitors 12 and 13 is jeopardized and, therefore, also the use of the restraints. This can lead to a warning or disconnection of the restraints.

Figure 2:
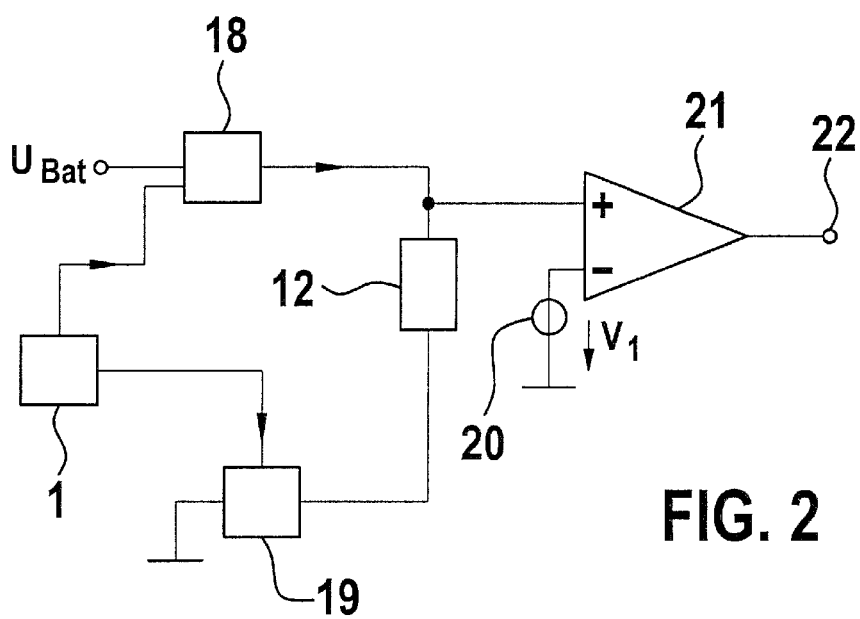
FIG. 2 is a diagnostic circuit.

FIG. 2 shows an example of a simple voltage measurement via ignitor 12. A battery voltage Vbat is applied to an input of a constant current source 18. Constant current source 18 supplies a constant diagnostic current coming from battery voltage Vbat. Constant current source 18 would thus correspond to diagnostic block 5 or diagnostic block 6. Constant current source 18 is triggered by processor 1. Processor 1 can, if need be, disconnect constant current source 18 or switch higher or lower currents in a later version. On one side, the output of constant current source 18 is connected to ignitor 12, and on the other to a positive input of a comparator 21. Since comparator 21 has a very high input resistance, all of the diagnostic current flows via ignitor 12, which is connected on its other side to a constant current sink 19. It is also possible to simply use a resistor here.

Constant current sink 19 itself is connected on its other side to the ground and is also controlled by processor 1. A constant voltage V1 is applied to a negative input of comparator 21 via voltage source 20, with which the voltage applied to the positive input of comparator 21 is compared. The shape of output signal 22 depends on whether voltage V1 is greater or smaller than the voltage at the positive input. This makes it possible to check the resistance via the decreasing voltage at ignitor 12.

Constant current source 18 and constant current sink 19 are each made up of current balancing circuits. Ignition circuit ICs 2 and 3 can also have several plus and minus output elements and thus supply several ignition circuits.

What is claimed is:

1. A device for triggering a plurality of ignition circuits, the plurality of ignition circuits including a first ignition circuit and a second ignition circuit, the device comprising:
- a plurality of separate semiconductor substrates including a first semiconductor substrate and a second semiconductor substrate;
- a plurality of plus output element transistors and a plurality of minus output element transistors, the plurality of plus output element transistors including a first plus output element transistor on the first semiconductor substrate and a second plus output element transistor on the second semiconductor substrate, the plurality of minus output element transistors including a first minus output element transistor on the first semiconductor substrate and a second minus output element transistor on the second semiconductor substrate, the first plus output element transistor and the second minus output element transistor being connected to the first ignition circuit, the second plus output element transistor and the first minus output element transistor being connected to the second ignition circuit;
- means for ignition circuit diagnosis assigned to each of the plus and minus output element transistors; and
- means for triggering the plus and minus output element transistors.

2. The device according to claim 1, wherein the means for ignition circuit diagnosis performs a resistance measurement of a respective ignition circuit.

3. The device according to claim 1, wherein each of the semiconductor substrates has at least one of the plus output element transistors and at least one of the minus output element transistors.

4. The device according to claim 1, further comprising a processor configured to control and monitor the semiconductor substrates.

5. The device according to claim 2, further comprising a processor configured to control and monitor the semiconductor substrates, the processor configured to one of disconnect a constant current source and switch one of higher and lower currents in accordance with the resistance measurement.

6. A device for triggering a plurality of ignition circuits, the ignition circuits including a first ignition circuit and a second ignition circuit, comprising:
- a plurality of separate semiconductor substrates including a first semiconductor substrate and a second semiconductor substrate;
- a plurality of plus output element transistors and a plurality of minus output element transistors, the plus output element transistors including a first plus output element transistor on the first semiconductor substrate and a second plus output element transistor on the second semiconductor substrate, the plurality of minus output element transistors including a first minus output element transistor on the first semiconductor substrate and a second minus output element transistor on the second semiconductor substrate, the first plus output element transistor and the second minus output element transistor connected to the first ignition circuit, the second plus output element transistor and the first minus output element transistor connected to the second ignition circuit;
- an arrangement configured for ignition circuit diagnosis assigned to each of the plus and minus output element transistors; and
- an arrangement configured to trigger the plus and minus output element transistors.

* * * * *